United States Patent
Takahashi et al.

(10) Patent No.: US 7,354,974 B2
(45) Date of Patent: Apr. 8, 2008

(54) BLENDS OF PERFLUOROELASTOMERS AND FLUOROPLASTICS

(75) Inventors: Kohtaro Takahashi, Saitama (JP); Yuji Onodera, Kanagawa (JP)

(73) Assignee: DuPont Performance Elastomers LLC, Wilmington, DE (US)

(*) Notice: Subject to any disclaimer, the term of this patent is extended or adjusted under 35 U.S.C. 154(b) by 473 days.

(21) Appl. No.: 11/114,627

(22) Filed: Apr. 26, 2005

(65) Prior Publication Data

US 2005/0261431 A1 Nov. 24, 2005

Related U.S. Application Data

(60) Provisional application No. 60/572,810, filed on May 20, 2004.

(51) Int. Cl.
 *C08J 3/00* (2006.01)
 *C08K 3/34* (2006.01)
 *C08K 3/40* (2006.01)
 *C08L 27/12* (2006.01)

(52) U.S. Cl. ..................... 525/199; 524/544

(58) Field of Classification Search ........... 525/199; 524/544
See application file for complete search history.

(56) References Cited

U.S. PATENT DOCUMENTS

| | | | |
|---|---|---|---|
| 3,332,907 A | 7/1967 | Angelo et al. | |
| 3,467,638 A | 9/1969 | Pattison | |
| 3,484,503 A | 12/1969 | Magner et al. | |
| 4,243,770 A | 1/1981 | Tatemoto et al. | |
| 4,281,092 A | 7/1981 | Breazeale | |
| 4,394,489 A | 7/1983 | Aufdermarsh | |
| 4,713,418 A | 12/1987 | Logothetis et al. | |
| 5,208,293 A * | 5/1993 | Oki et al. | 525/199 |
| 5,565,512 A | 10/1996 | Saito et al. | |
| 5,696,189 A * | 12/1997 | Legare | 524/232 |
| 5,789,489 A | 8/1998 | Coughlin et al. | |
| 5,789,509 A | 8/1998 | Schmiegel | |
| 6,191,208 B1 * | 2/2001 | Takahashi | 524/494 |
| 6,281,296 B1 | 8/2001 | MacLachlan et al. | |
| 6,710,132 B2 | 3/2004 | Apostolo et al. | |
| 6,844,036 B2 | 1/2005 | Apostolo et al. | |

* cited by examiner

*Primary Examiner*—Nathan M. Nutter

(57) ABSTRACT

Cured articles are prepared from a composition that comprises a blend of a perfluoroelastomer and 51-300 phr of a semi-crystalline thermoplastic copolymer comprising copolymerized units of tetrafluoroethylene and 5-12 weight percent of a perfluoro(alkyl vinyl ether). The semi-crystalline copolymer is present as particles having an average particle size greater than 100 nm.

10 Claims, No Drawings

BLENDS OF PERFLUOROELASTOMERS AND FLUOROPLASTICS

CROSS-REFERENCE TO RELATED APPLICATIONS

This application claims the benefit of U.S. Provisional Application No. 60/572,810 filed May 20, 2004.

FIELD OF THE INVENTION

The present invention relates to curable blends of perfluoroelastomers and semi-crystalline thermoplastic copolymers having an average particle size greater than 100 nm.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment used at high temperatures.

The outstanding properties of perfluoroelastomers are largely attributable to the stability and inertness of the copolymerized perfluorinated monomer units that make up the major portion of the polymer backbones in these compositions. Such monomers include tetrafluoroethylene and perfluorinated vinyl ethers. In order to develop elastomeric properties fully, perfluoroelastomers are typically crosslinked, i.e. vulcanized. To this end, a small amount of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

U.S. Pat. No. 3,484,503 discloses single phase blends of an elastomeric copolymer of tetrafluoroethylene and perfluoro(alkyl vinyl ether) with a thermoplastic copolymer of tetrafluoroethylene. The elastomeric component does not contain a cure site and so the composition cannot be crosslinked. Seals made from such compositions have relatively poor sealing properties due to the lack of crosslinks.

U.S. Pat. No. 4,713,418 discloses curable perfluoroelastomer compositions which contain a melt blend of perfluoroelastomer and from 2 to 50 parts by weight of a thermoplastic perfluoropolymer. Typically, the thermoplastic polymer has a melting point of at least 300° C. Due to the relatively small loading of thermoplastic perfluoropolymer, seals prepared from these compositions lack the physical strength required for high pressure sealing applications U.S. Pat. No. 6,710,132 B2 discloses latex blends of a perfluoroelastomer with 2-90 weight percent of a semi-crystalline core/shell fluoroplastic wherein the shell polymer contains bromine and/or iodine in the polymer chain. WO 02/79280 discloses curable latex blends of perfluoroelastomer and fluororesin, wherein the fluororesin has a melting point between 230° and 300° C. and an average particle size of less than 100 nm. Latex blends are not simple or cost effective to make on a commercial scale.

It would be desirable to have a perfluoroelastomer composition which, when crosslinked, provides the combination of good sealing properties, sufficient strength for use in high pressure applications, good chemical resistance and wherein the composition may be made in conventional rubber processing equipment.

SUMMARY OF THE INVENTION

An aspect of this invention is a process for preparing a cured article, said process comprising:
A. dry blending, at a temperature below 100° C., i) a perfluoroelastomer, ii) 51 to 300 parts by weight per hundred parts by weight perfluoroelastomer of a semi-crystalline copolymer comprising copolymerized units of tetrafluoroethylene and 5-12 weight percent of a perfluoro(alkyl vinyl ether), said semi-crystalline copolymer having an average particle size greater than 100 nm and a melting point, and iii) a curative to form a curable composition;
B. curing said composition to form a cured article; and
C. post curing said cured article at a temperature above the melting point of said semi-crystalline copolymer.

Another aspect of this invention is a process for preparing a cured article, said process comprising:
A. melt blending i) a perfluoroelastomer and ii) 51 to 300 parts by weight per hundred parts by weight perfluoroelastomer of a semi-crystalline copolymer comprising copolymerized units of tetrafluoroethylene and 5-12 weight percent of a perfluoro(alkyl vinyl ether), said semi-crystalline copolymer having an average particle size greater than 100 nm and a melting point, said blending done at a temperature above the melting point of said semi-crystalline copolymer, thus forming a blend;
B. adding a curative to said blend at a temperature below 150° C.; and
C. curing said composition to form a cured article.

Another aspect of this invention is a cured article prepared from either of the above processes.

DETAILED DESCRIPTION OF THE INVENTION

Perfluoroelastomers are generally amorphous polymeric compositions having copolymerized units of at least two principal perfluorinated monomers. Generally, one of the principal monomers is a perfluoroolefin while the other is a perfluorovinyl ether. Representative perfluorinated olefins include tetrafluoroethylene and hexafluoropropylene. Suitable perfluorinated vinyl ethers include those of the formula

$$CF_2=CFO(R_f O)_n(R_{f'}O)_m R_f$$ (I)

where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms.

A preferred class of perfluorinated vinyl ethers includes compositions of the formula

$$CF_2=CFO(CF_2CFXO)_n R_f$$ (II)

where X is F or $CF_3$, n is 0-5, and $R_f$ is a perfluoroalkyl group of 1-6 carbon atoms. Most preferred perfluorinated vinyl ethers are those wherein n is 0 or 1 and $R_f$ contains 1-3 carbon atoms. Examples of such perfluorinated ethers include perfluoro(methyl vinyl ether) and perfluoro(propyl vinyl ether).

Other useful monomers include compounds of the formula $$CF_2=CFO[(CF_2)_mCF_2CFZO]_nR_f \quad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluorinated vinyl ether monomers include compounds of the formula $$CF_2=CFO[(CF_2CFCF_3O)_n(CF_2CF_2CF_2O)_m(CF_2)_p]C_xF_{2x+1} \quad (IV)$$

where m and n=1-10, p=0-3, and x=1-5. Preferred members of this class include compounds where n=0-1, m=0-1, and x=1.

Additional examples of useful perfluorinated vinyl ethers include $$CF_2=CFOCF_2CF(CF_3)O(CF_2O)_mC_nF_{2n+1} \quad (V)$$

where n=1-5, m=1-3, and where, preferably, n=1.

Preferred perfluoroelastomer copolymers are comprised of tetrafluoroethylene and at least one perfluorinated vinyl ether as principal monomer units. In such copolymers, the copolymerized perfluorinated ether units constitute from about 15-50 mole percent of total monomer units in the polymer.

The perfluoroelastomer further contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2-12, preferably 2-6;

$$CF_2=CF-O[CF_2-CF(CF_3)-O]_n-CF_2-CFCF_3-CN \quad (VI)$$

where n=0-4, preferably 0-2; and $$CF_2=CF-[OCF_2CF(CF_3)]_x-O-(CF_2)_n-CN \quad (VIII)$$

where x=1-2, and n=1-4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (IX)$$

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene, as well as brominated olefins such as 4-bromo-3,3,4,4-tetrafluorobutene-1 and bromotrifluoroethylene.

Another type of cure site monomer which may be incorporated in the perfluoroelastomers employed in this invention is perfluoro(2-phenoxypropyl vinyl ether) and related monomers as disclosed in U.S. Pat. No. 3,467,638.

An especially preferred perfluoroelastomer comprises copolymerized units of 53.0-79.9 mole percent tetrafluoroethylene, 20.0-46.9 mole percent perfluoro(methyl vinyl ether) and 0.4 to 1.5 mole percent of a cure site monomer, preferably a nitrile-containing cure site monomer. Mole percentages are based on total moles of all copolymerized monomer units in the perfluoroelastomer.

Alternatively, or in addition to a cure site monomer, the perfluoroelastomer may contain iodine and/or bromine atoms at terminal positions on the perfluoroelastomer polymer chains. Such atoms may be introduced during polymerization by reaction of an iodine or bromine-containing chain transfer agent as described in U.S. Pat. No. 4,243,770.

The semi-crystalline fluoropolymer (i.e. a thermoplastic perfluoropolymer) employed in the compositions of this invention is a copolymer comprising copolymerized units of tetrafluoroethylene and 5 to 12 weight percent (based on total weight of the copolymer) of a perfluoro(alkyl vinyl ether). Perfluoro(alkyl vinyl ethers) include perfluoro(methyl vinyl ether), perfluoro(ethyl vinyl ether) and perfluoro(propyl vinyl ether). Perfluoro(ethyl vinyl ether) and perfluoro(propyl vinyl ether) are preferred. Such fluoropolymers have a nominal melting point (ASTM D3418) of 285°-310° C. The number average particle size of the fluoropolymer is greater than 100 nm, preferably greater than 1 μm. A preferred semi-crystalline fluoropolymer is Teflon® PFA fluoropolymer resin available from DuPont. An especially preferred fluoropolymer is Teflon® PFA HP Plus which is available in 2.5 mm pellets. Such a relatively large particle size semi-crystalline fluoropolymer facilitates the blending with perfluoroelastomer on conventional rubber mixing equipment such as roll mills, mixers and extruders.

Cured articles of this invention comprise perfluoroelastomer, 51 to 300 (preferably 60 to 200, most preferably 75-200) phr of the above defined semi-crystalline fluoropolymer and a curative. The term "phr" refers to parts by weight of ingredient per hundred parts by weight rubber (i.e. perfluoroelastomer).

Curable compositions employed to make the cured articles of this invention may be made by either melt blending semi-crystalline fluoropolymer with perfluoroelastomer or by dry blending semi-crystalline fluoropolymer with perfluoroelastomer at a temperature below the melting point of the semi-crystalline fluoropolymer. However, it is important that the semi-crystalline fluoropolymer be melted at some point during the cured article manufacturing process.

By "melt blending" is meant blending dry ingredients (i.e. not a latex or liquid dispersion) at a temperature above the melting point of the semi-crystalline fluoropolymer. The melt blending temperature should be kept below the temperature where significant thermal decomposition of the perfluoroelastomer or semi-crystalline fluoropolymer could take place during the time blending is occurring. A preferred melt blending temperature is between 300° and 350° C. After melt blending the perfluoroelastomer and semi-crystalline fluoropolymer, curative is added to the blend at a temperature below 150° C. (preferably below 100° C.). It is important that the curative not be added at higher temperatures so that curing (i.e. crosslinking) does not begin before the composition is shaped into an article. Cured articles may then be made from the latter composition by, optionally shaping the composition, and then crosslinking (i.e. curing). Optionally the article may also be post cured.

Preferably, cured articles of the invention are made from a curable composition made by dry blending the perfluoroelastomer, semi-crystalline fluoropolymer and curative at a temperature well below the melting point of the semi-crystalline fluoropolymer and also below the temperature where significant crosslinking occurs (i.e. at a temperature below 100° C., preferably less than 50° C.). By "dry blending" is meant blending together ingredients which contain little, if any, water or solvent, as opposed to latex, liquid dispersion or solution blending wherein significant quantities of water or solvent are present. Optionally, the dry blending process may be done in two steps wherein the perfluoroelastomer and semi-crystalline fluoropolymer are pre-blended (at a temperature well below the melting point of the semi-crystalline fluoropolymer) prior to introduction of the curative. The composition is then typically shaped and cured, i.e. crosslinked, preferably at a temperature below the melting point of the semi-crystalline fluoropolymer. The resulting article is then post cured at a temperature above the melting point of the semi-crystalline fluoropolymer (i.e. post cured at a temperature between 300° and 350° C.) for at least the time required to melt the semi-crystalline fluoropolymer. Typically, the article is post cured for a period of 5 to 30 hours under an inert atmosphere (e.g. nitrogen) or in air in order to both melt the semi-crystalline fluoropolymer and to further crosslink the perfluoroelastomer. Post cure conditions should be kept below the temperature where significant thermal decomposition of the perfluoroelastomer or semi-crystalline fluoropolymer could take place during the time that the article is post cured. Surprisingly, cured articles made from this process have better physical properties than do articles made from a melt blend composition of perfluoroelastomer and semi-crystalline fluoropolymer.

When the perfluoroelastomer has copolymerized units of a nitrile-containing cure site monomer, a cure system based on an organotin compound can be utilized. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5-10 parts by weight per 100 parts elastomer (phr) of curing agent can be used, and 1-4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above.

A preferred cure system, useful for perfluoroelastomers containing nitrile-containing cure sites, utilizes bis(aminophenols) and bis(aminothiophenols) of the formulas

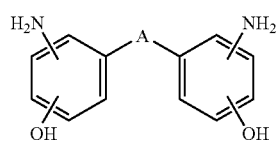

and

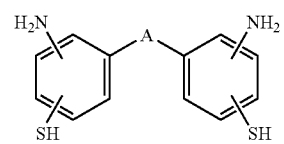

and tetraamines of the formula

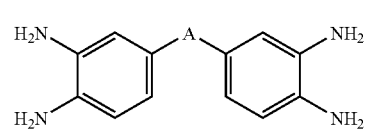

where A is $SO_2$, O, CO, alkylene of 1-6 carbon atoms, perfluoroalkylene of 1-10 carbon atoms, or a carbon-carbon bond linking the two aromatic rings. The amino and hydroxyl or thio groups in formulas X and XI above are adjacent to each other on the benzene rings and are interchangeably in the meta and para positions with respect to the group A. Preferably, the curing agent is a compound selected from the group consisting of 4,4'-[2,2,2-trifluoro-1-(trifluoromethyl)ethylidene]bis(2-aminophenol); 4,4'-sulfonylbis (2-aminophenol); 3,3'-diaminobenzidine; and 3,3',4,4'-tetraaminobenzophenone. The first of these is the most preferred and will be referred to as bis(aminophenol) AF. The curing agents can be prepared as disclosed in U.S. Pat. No. 3,332,907 to Angelo. Bis(aminophenol) AF can be prepared by nitration of 4,4'-[2,2,2-trifluoro-1-(trifluoromethyl)ethylidene]-bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the perfluoroelastomer is used. Typically, 0.5-5 parts by weight of the curative per 100 parts of elastomer is required. The preferred range is 1-2 phr.

Peroxides may also be utilized as curing agents, particularly when the cures site is a nitrile, an iodine or bromine group. Useful peroxides are those which generate free radicals at curing temperatures. A dialkyl peroxide or a bis(dialkyl peroxide) which decomposes at a temperature above 50° C. is especially preferred. In many cases it is preferred to use a ditertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)butyl]carbonate. Generally, about 1-3 parts of peroxide per 100 parts of perfluoroelastomer is used. Another material which is usually blended with the composition as a part of the peroxide curative system is a coagent composed of a polyunsaturated compound which is capable of cooperating with the peroxide to provide a useful cure. These coagents can be added in an amount between 0.1 and 10 parts per 100 parts perfluoroelastomer, preferably between 2-5 phr. The coagent may be one or more of the following compounds: triallyl cyanurate; triallyl isocyanurate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Other curatives suitable for vulcanizing perfluoroelastomers having nitrile cure sites include ammonia, the ammonium salts of inorganic or organic acids (e.g. ammonium perfluorooctanoate) as disclosed in U.S. Pat. No. 5,565,512, and compounds (e.g. urea) which decompose at curing temperatures to produce ammonia as disclosed in U.S. Pat. No. 6,281,296 B1.

Depending on the cure sites present, it is also possible to use a dual cure system. For example, perfluoroelastomers having copolymerized units of nitrile-containing cure site monomers can be cured using a curative comprising a mixture of a peroxide in combination with an organotin curative and a coagent. Generally, 0.3-5 parts of peroxide, 0.3-5 parts of coagent, and 0.1-10 parts of organotin curative are utilized.

Additives, such as fillers (e.g. carbon black, barium sulfate, silica, aluminum oxide, aluminum silicate, and titanium dioxide), stabilizers, plasticizers, lubricants, and processing aids typically utilized in perfluoroelastomer compounding can be incorporated into the compositions of the present invention, provided they have adequate stability for the intended service conditions. Preferably, any additives present in the compositions of the invention are introduced at a temperature below 150° C. However, in a preferred embodiment of the invention, no carbon black, metallic fillers, metal salts, metal oxides or metal hydroxides are employed in the compositions of the invention. Thus, such embodiments of the invention have very low extractable metals and are especially suitable for use in environments that require high purity seals such as semiconductor manufacturing, and pharmaceutical manufacturing.

The cured perfluoroelastomer articles of this invention have good sealing properties, sufficient strength for use in high pressure applications, creep resistance, flexibility, and excellent chemical resistance. By "good sealing properties" is meant that the Tensile Set (% recovery) at 25° C., 200% elongation is at least 25%. By "sufficient strength for use in high pressure applications" is meant a modulus at 100% elongation of at least 5.5 MPa. By "excellent chemical resistance" is meant a volume swell of less than 12% when a cured perfluoroelastomer article is exposed for 70 hours to either 90° C. ethylenediamine or to 225° C. steam.

The articles are useful in many applications such as seals, gaskets, tubes, wire jackets, and rollers which will be exposed to environments such as high temperatures, harsh chemicals and high pressure situations. Specific end use applications include semiconductor manufacturing equipment, the chemical process, food and pharmaceutical industries, and business machines (i.e. copier and printer rollers).

EXAMPLES

Test Methods

Cure Characteristics

Cure characteristics were measured using a Monsanto MDR 2000 instrument under the following conditions:
 Moving die frequency: 1.66 Hz
 Oscillation amplitude: 1.0
 Temperature: 190° C., unless otherwise noted
 Sample size: Disks having diameter of 45 mm, and thickness of 5 mm
 Duration of test: 20 minutes The following cure parameters were recorded:
 $M_H$: maximum torque level, in units of N·m
 $M_L$: minimum torque level, in units of N·m
 $t_s1$: minutes to 0.04 N·m rise above $M_L$
 $t_c90$: minutes to 90% of maximum torque Test specimens were prepared from elastomer compounded with appropriate additives, as described in the formulations listed in the Examples below. Compounding was carried out on a rubber mill or in a Banbury mixer. The milled composition was formed into a sheet and a 10 g sample was died out into a disk to form the test specimen.

Cure characteristics were determined by placing a test specimen in the sealed test cavity of the instrument which was maintained under a positive pressure and elevated temperature. A biconical disk was embedded in the test specimen and was oscillated through an arc of 0.5° at the specified frequency, thereby exerting a shear strain on the test specimen. The force at maximum amplitude (torque) required to rotate the disk is proportional to the stiffness (shear modulus) of the rubber. This torque was recorded as a function of time. Because stiffness of a rubber specimen increases during curing, the test provides a measure of curability. A test is completed when the recorded torque either reaches equilibrium or maximum value, or when a predetermined time has elapsed. The time required to obtain a curve is a function of the test temperature and the characteristics of the rubber compound.

Tensile Properties

Unless otherwise noted, stress/strain properties were measured on test specimens that had been press cured at 190° C. for 4 minutes and then post cured in air for 10 hours at 305° C. Physical property measurements were obtained according to methods described in ASTM D 412. The following parameters were recorded:
 $M_{100}$, modulus at 100% elongation in units of MPa
 $T_B$, tensile strength at break in units of MPa
 $E_B$, elongation at break in units of %
 Durometer Hardness, Shore A Compression set of O-ring samples was determined in accordance with ASTM D 395.

Tensile Set, in units of % Recovery, at 25° C., 200% elongation was determined in accordance with ASTM D412.

Chemical Resistance, % volume swell, was determined by ASTM D471.

Examples 1-7 and Controls A-E

The perfluoroelastomer employed in the Examples and Controls contained copolymerized units of 68.2 mole percent tetrafluoroethylene, 31.0 mole percent perfluoro(methyl vinyl ether) and 0.80 mole percent perfluoro(8-cyano-5-methyl-3,6-dioxa-1-octene) and was prepared according to the general process described in U.S. Pat. No. 5,789,489.

The semi-crystalline fluoropolymer employed was Teflon® PFA grade 940, 945 or 950 available from DuPont-Mitsui Fluorochemicals Co.

Compositions of the invention (Examples 1-6) and Controls D and E were made by compounding the perfluoroelastomer and semi-crystalline, fluoropolymer in an open roll mill at 40° C. The curative and other ingredients were then added to the mill under the same conditions. Control compositions (Controls A-C) were made by compounding the ingredients in an open roll mill at 40° C. The ingredients and proportions are shown in Table I. Curing characteristics, chemical resistance and tensile properties were measured according to the Test Methods and are also shown in Table 1.

Another composition of the invention (Example 7) was made by melt blending at 320° C. the perfluoroelastomer and semi-crystalline fluoropolymer in a Laboplasto mill (Toyo- Seiki). Curative and other ingredients were then added to the blend at 40° C. on a 2 roll mill. The ingredients and proportions are shown in Table I. Curing characteristics and tensile properties were measured according to the Test Methods and are also shown in Table I.

TABLE I

| Formulation (phr) | Ex. 1 | Ex. 2 | Ex. 3 | Ex. 4 | Ex. 5 | Ex. 6 | Ex. 7 | Control A | Control B | Control C | Control D | Control E |
|---|---|---|---|---|---|---|---|---|---|---|---|---|
| Perfluoroelastomer | 100 | 100 | 100 | 100 | 100 | 100 | 100 | 100 | 100 | 0 | 100 | 100 |
| PFA 940 | 51 | 0 | 0 | 0 | 0 | 0 | 0 | 0 | 0 | 0 | 0 | 0 |
| PFA 945 | 0 | 51 | 0 | 100 | 200 | 300 | 51 | 0 | 0 | 100 | 40 | 45 |
| PFA 950 | 0 | 0 | 51 | 0 | 0 | 0 | 0 | 0 | 0 | 0 | 0 | 0 |
| Urea | 0.3 | 0.3 | 0.3 | 0.3 | 0.3 | 0.3 | 0.3 | 0.3 | 0.3 | 0 | 0.3 | 0.3 |
| MT Carbon Black | 0 | 0 | 0 | 0 | 0 | 0 | 0 | 0 | 30 | 0 | 0 | 0 |
| Curing Characteristics | | | | | | | | | | | | |
| $M_L$, N·m | 1.10 | 1.09 | 1.15 | 1.60 | 1.95 | 2.46 | 0.88 | NT | 0.98 | NT | NT | NT |
| $M_H$, N·m | 2.09 | 2.23 | 2.25 | 2.52 | 2.70 | 3.44 | 2.54 | NT | 2.48 | NT | NT | NT |
| ts1, minutes | 0.2 | 0.2 | 0.2 | 0.1 | 0.2 | 0.2 | 0.2 | NT | 0.2 | NT | NT | NT |
| $T_{90}$, minutes | 4.0 | 5.2 | 4.3 | 5.6 | 2.6 | 3.0 | 1.1 | NT | 5.9 | NT | NT | NT |
| Tensile Properties | | | | | | | | | | | | |
| $T_B$, MPa | 16.2 | 18.7 | 18.0 | 22.0 | 27.6 | 26.1 | 17.7 | 10.6 | 17.3 | 41.3 | NT | NT |
| $E_B$, % | 316 | 318 | 336 | 332 | 327 | 228 | 330 | 358 | 242 | NT | NT | NT |
| $M_{100}$, MPa | 5.9 | 6.3 | 5.8 | 8.8 | 11.9 | 15.3 | 6.2 | 1.5 | 7.5 | 17.3 | 5.4 | NT |
| Hardness, Shore A | 76 | 77 | 78 | 89 | 95 | 97 | 78 | 54 | 73 | 97 | NT | NT |
| Chemical Resistance | | | | | | | | | | | | |
| Ethylenediamine, 90° C., 70 hours, % volume swell | 9.4 | NT | NT | NT | NT | NT | NT | NT | NT | NT | 15.7 | 17.5 |
| Steam, 225° C., 70 hours, % volume swell | 11.4 | NT | NT | NT | NT | NT | NT | NT | NT | NT | 32.5 | 27.3 |
| Compression Set, 204° C., 70 hours | | | | | | | | | | | | |
| 10% compression | 55 | 51 | 56 | 60 | 67 | NT | NT | NT | NT | NT | NT | NT |
| 25% compression | 40 | 38 | 39 | 50 | 62 | NT | NT | 80 | 12 | 100 | NT | NT |
| Tensile Set, 25° C., 200% elongation | | | | | | | | | | | | |
| Recovery, % | NT | 70 | NT | 48 | 33 | 26 | NT | NT | NT | 0 | NT | NT |

NT means not tested.

What is claimed is:

1. A process for preparing a cured article, said process comprising:
    A. dry blending, at a temperature below 100° C., i) a perfluoroelastomer, ii) 51 to 300 parts by weight per hundred parts by weight perfluoroelastomer of a semi-crystalline copolymer comprising copolymerized units of tetrafluoroethylene and 5-12 weight percent of a perfluoro(alkyl vinyl ether), said semi-crystalline copolymer having an average particle size greater than 100 nm and a melting point, and iii) a curative to form a curable composition;
    B. curing said composition to form a cured article; and
    C. post curing said cured article at a temperature above the melting point of said semi-crystalline copolymer.

2. A process of claim 1 wherein curing step B) takes place at a temperature below the melting point of said semi-crystalline copolymer.

3. A process of claim 1 wherein said dry blending step A) is at a temperature below 50° C.

4. A process of claim 1 wherein said curable composition contains 60 to 200 parts by weight of said semi-crystalline copolymer per hundred parts by weight perfluoroelastomer.

5. A cured article prepared by a process comprising:
    A. dry blending, at a temperature below 100° C., i) a perfluoroelastomer, ii) 51 to 300 parts by weight per hundred parts by weight perfluoroelastomer of a semi-crystalline copolymer comprising copolymerized units of tetrafluoroethylene and 5-12 weight percent of a perfluoro(alkyl vinyl ether), said semi-crystalline copolymer having an average particle size greater than 100 nm and a melting point, and iii) a curative to form a curable composition;
    B. curing said composition to form a cured article; and
    C. post curing said cured article at a temperature above the melting point of said semi-crystalline copolymer.

6. A cured article of claim 5 wherein curing step B) takes place at a temperature below the melting point of said semi-crystalline copolymer.

7. A cured article of claim 5 wherein said dry blending step A) is at a temperature below 50° C.

8. A cured article of claim 5 wherein said curable composition contains 60 to 200 parts by weight of said semi-crystalline copolymer per hundred parts by weight perfluoroelastomer.

9. A cured article of claim 8 wherein said curable composition contains 75 to 200 parts by weight of said semi-crystalline copolymer per hundred parts by weight perfluoroelastomer.

10. A cured article of claim 5 wherein said perfluoroelastomer comprises copolymerized units of 53.0-79.9 mole percent tetrafluoroethylene, 20.0-46.9 mole percent perfluoro(methyl vinyl) ether and 0.4 to 1.5 mole percent of a cure site monomer.

* * * * *